United States Patent
Tanida et al.

(10) Patent No.: US 12,054,645 B2
(45) Date of Patent: *Aug. 6, 2024

(54) ETHYLENE-VINYL ALCOHOL COPOLYMER, METHOD FOR PRODUCING SAME, AND USE THEREOF

(71) Applicant: KURARAY CO., LTD., Kurashiki (JP)

(72) Inventors: Tatsuya Tanida, Kurashiki (JP); Keisuke Morikawa, Kurashiki (JP); Masako Katayama, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 893 days.

This patent is subject to a terminal disclaimer.

(21) Appl. No.: 17/047,855

(22) PCT Filed: Apr. 16, 2019

(86) PCT No.: PCT/JP2019/016271
§ 371 (c)(1),
(2) Date: Oct. 15, 2020

(87) PCT Pub. No.: WO2019/203216
PCT Pub. Date: Oct. 24, 2019

(65) Prior Publication Data
US 2021/0108111 A1   Apr. 15, 2021

(30) Foreign Application Priority Data

Apr. 17, 2018 (JP) ................. 2018-079469

(51) Int. Cl.

| | | |
|---|---|---|
| C09J 11/04 | (2006.01) | |
| C08F 216/06 | (2006.01) | |
| C08K 5/01 | (2006.01) | |
| C08K 5/09 | (2006.01) | |
| C08L 29/04 | (2006.01) | |
| C09J 129/04 | (2006.01) | |
| C08K 3/34 | (2006.01) | |

(52) U.S. Cl.
CPC ........... C09J 129/04 (2013.01); C08F 216/06 (2013.01); C09J 11/04 (2013.01); C08K 3/346 (2013.01)

(58) Field of Classification Search
CPC ........ C09J 129/04; C09J 11/04; C08F 216/06; C08F 3/346; C08F 210/02; C08F 8/12; C08K 2003/265; C08K 5/01; C08K 5/09; C08L 29/04

USPC .......................................................... 524/447
See application file for complete search history.

(56) References Cited

U.S. PATENT DOCUMENTS

| | | | | |
|---|---|---|---|---|
| 5,240,997 A | * | 8/1993 | Yanai ..................... | C08F 218/04 525/60 |
| 11,746,263 B2 | * | 9/2023 | Imaoka .................... | C09J 11/08 524/501 |
| 2013/0017383 A1 | * | 1/2013 | Tai .......................... | B32B 27/32 428/220 |
| 2022/0259467 A1 | * | 8/2022 | Taoka ..................... | A47G 21/18 |
| 2023/0118744 A1 | * | 4/2023 | Kaharu ................ | C09D 101/02 525/56 |
| 2023/0257491 A1 | * | 8/2023 | Inubushi ................... | C08F 8/12 525/56 |

FOREIGN PATENT DOCUMENTS

| | | |
|---|---|---|
| JP | 2-84478 A | 3/1990 |
| JP | 4-239085 A | 8/1992 |
| JP | 8-283682 A | 10/1996 |
| JP | 2001-164219 A | 6/2001 |
| JP | 2001-172593 A | 6/2001 |
| JP | 2008-239848 A | 10/2008 |
| JP | 2009-84316 A | 4/2009 |
| KR | 10-2011-0128338 A | 11/2011 |

OTHER PUBLICATIONS

English Translation of JP 2001-172593 (Year: 2001).*
International Search Report issued on Jul. 16, 2019 in PCT/JP2019/016271 filed on Apr. 16, 2019, 4 pages.

* cited by examiner

*Primary Examiner* — Hannah J Pak
(74) *Attorney, Agent, or Firm* — Oblon, McClelland, Maier & Neustadt, L.L.P.

(57) ABSTRACT

An ethylene-vinyl alcohol copolymer may have an ethylene unit content of 1 mol % or more and less than 20 mol %, a viscosity-average polymerization degree of 200 to 5000 and a saponification degree of 80 to 99.7 mol %. A block character of ethylene units in the ethylene-vinyl alcohol copolymer may be 0.90 to 0.99. Such an ethylene-vinyl alcohol copolymer may have excellent high-speed coating ability and water-resistant adhesiveness, particularly when being used as an adhesive.

20 Claims, 2 Drawing Sheets

21  22  23

24

ETHYLENE-VINYL ALCOHOL COPOLYMER, METHOD FOR PRODUCING SAME, AND USE THEREOF

CROSS-REFERENCE TO RELATED APPLICATIONS

The present application is the national stage of international application PCT/JP2019/016271, filed on Apr. 16, 2019, and claims the benefit of the filing date of Japanese Appl. No. 2018-079469, filed on Apr. 17, 2018.

TECHNICAL FIELD

The present invention relates to an ethylene-vinyl alcohol copolymer in which a block character of ethylene units is within a particular range, and a production method therefor. The present invention also relates to a composition, an aqueous solution and an adhesive, which contain the ethylene-vinyl alcohol copolymer.

BACKGROUND ART

Polyvinyl alcohol (hereinafter, sometimes abbreviated as "PVA") is known to be a synthetic water-soluble polymer, which is extensively used in various applications such as a starting material for a synthetic fiber vinylon, a fiber processing agent, an adhesive, a stabilizer for emulsion polymerization and suspension polymerization, a binder for an inorganic material and a film. In particular, an adhesive containing PVA is a well-balanced adhesive which is not only inexpensive but also excellent in initial tackiness, equilibrium adhesive power, over-time stability of adhesive power and the like, so that it has been extensively used in various applications such as paper board, cardboard, paper core, Fusuma and wallpaper.

Thickening of a PVA-containing adhesive and intrusion of a large amount of bubbles sometimes become problems in coating. Furthermore, an adhesive having high-speed coating ability on a paper has been recently particularly requested for cost reduction and productivity improvement. In association with such speed-up of coating, there have been often problems including spread of the adhesive as stripes over the rolls when shear stress is applied between coating rolls, leading to coating irregularity; stringing phenomenon between rolls; and scattering of small adhesive droplets called as jumping which causes contamination of parts other than an adhesive coating part and blocking between products when the products are piled.

Thus, there have been attempts to improve high-speed coating ability of an adhesive. For example, there have been reported an adhesive made of a PVA obtained by saponifying a vinyl ester polymer with an acid catalyst (Patent Reference No. 1), and an adhesive made of a PVA and clay containing a bivalent or more metal salt of sulfuric acid (Patent Reference No. 2). These adhesives are improved in high-speed coating ability and initial adhesive power, but exhibit poor solution stability and poor water-resistant adhesiveness. These are, therefore, industrially unsatisfactory. Furthermore, Patent Reference No. 3 has described an adhesive made of a PVA containing a specified amount of intramolecular 1,2-glycol bonds in order to improve solution stability and the like. The adhesive, however, exhibited insufficient water-resistant adhesiveness.

Furthermore, Patent Reference No. 4 has described an adhesive made of an ethylene-modified PVA for the purpose of improvement in solution stability and water-resistant adhesiveness. The adhesive was, however, industrially unsatisfactory in terms of high-speed coating ability.

PRIOR ART REFERENCES

Patent References

Patent Reference No. 1: JP 1990-84478A
Patent Reference No. 2: JP 1992-239085A
Patent Reference No. 3: JP 2001-164219A
Patent Reference No. 4: JP 2001-172593A

SUMMARY OF THE INVENTION

Problems to be Solved by the Invention

To solve the above problems, an objective of the present invention is to provide an ethylene-vinyl alcohol copolymer in which a block character of ethylene units satisfies a prescribed condition and a production method therefor. Another objective is to provide an aqueous solution containing the ethylene-vinyl alcohol copolymer, particularly an adhesive consisting of the aqueous solution achieving both high-speed coating ability and water-resistant adhesiveness.

Means for Solving the Problems

The above problems are solved by providing an ethylene-vinyl alcohol copolymer with an ethylene unit content of 1 mol % or more and less than 20 mol %, a viscosity-average polymerization degree of 200 to 5000 and a saponification degree of 80 to 99.7 mol %, wherein a block character of ethylene units in the ethylene-vinyl alcohol copolymer is 0.90 to 0.99.

A suitable embodiment of the present invention is an ethylene-vinyl alcohol copolymer composition comprising the ethylene-vinyl alcohol copolymer, and a compound having a conjugated double bond with a molecular weight of 1000 or less, wherein a content of the compound is 0.000001 to 0.01 parts by mass based on 100 parts by mass of the ethylene-vinyl alcohol copolymer.

A suitable embodiment of the present invention is an aqueous solution comprising the ethylene-vinyl alcohol copolymer. A more suitable embodiment is an adhesive consisting of the aqueous solution. It is suitable that the aqueous solution further contains an inorganic filler. In a more suitable embodiment, a content of the inorganic filler is 20 to 500 parts by mass based on 100 parts by mass of the ethylene-vinyl alcohol copolymer.

The above problems can be also solved by providing a method for producing the ethylene-vinyl alcohol copolymer by reacting ethylene with a vinyl ester to give an ethylene-vinyl ester copolymer and then saponifying the ethylene-vinyl ester copolymer, comprising, in production of the ethylene-vinyl ester copolymer, (a) the step of contacting a solution containing the vinyl ester with an ethylene-containing gas while stirring the solution with a wide paddle blade in a polymerization tank such that an agitation power Pv per unit volume is 0.5 to 10 kW/m$^3$ and a Froude number Fr is 0.05 to 0.2.

Here, it is preferable that the polymerization tank is connected to a heat exchanger via a pipe, further comprising, in production of the ethylene-vinyl ester copolymer, (b) the step of introducing an ethylene-containing gas present in a gas-phase part in the polymerization tank, into the heat exchanger; (c) the step of feeding a vinyl ester to the heat exchanger; (d) the step of contacting the vinyl ester with the ethylene-containing gas in the heat exchanger; and (e) the step of discharging the vinyl ester in which ethylene is dissolved, from the heat exchanger and introducing the vinyl ester into the polymerization tank.

Effects of the Invention

An ethylene-vinyl alcohol copolymer of the present invention in which a block character of ethylene units is within a prescribed range is excellent in high-speed coating ability and water-resistant adhesiveness, particularly when being used as an adhesive. According to a production method of the present invention, a block character of ethylene units can be controlled, so that such an ethylene-vinyl alcohol copolymer can be obtained.

MODES FOR CARRYING OUT THE INVENTION

[Ethylene-Vinyl Alcohol Copolymer]

Figure 1:
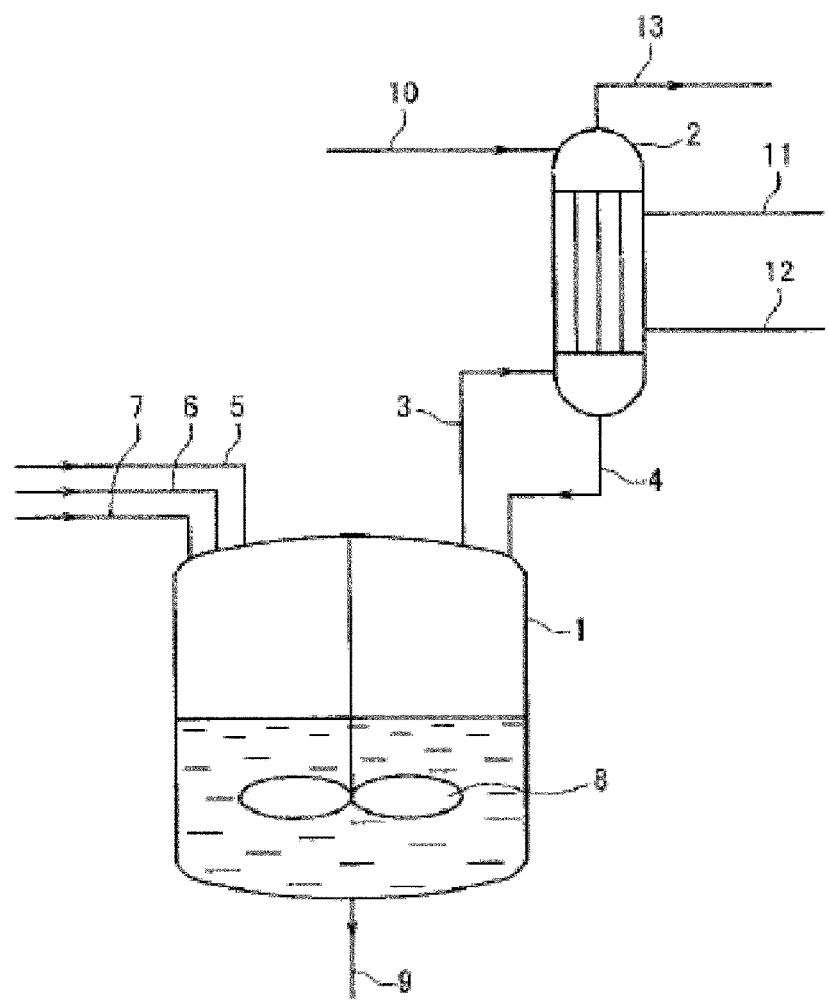
FIG. 1 is a schematic view of a polymerization apparatus used in Examples.

An ethylene-vinyl alcohol copolymer of the present invention is an ethylene-vinyl alcohol copolymer having an ethylene unit content of 1 mol % or more and less than 20 mol %, a viscosity-average polymerization degree of 200 to 5000, and a saponification degree of 80 to 99.7 mol %, wherein a block character of ethylene units is 0.90 to 0.99.

(Block Character of Ethylene Units)

An ethylene-vinyl alcohol copolymer of the present invention is particularly characterized in that a block character of ethylene units is 0.90 to 0.99. With the block character being 0.90 or more, the ethylene-vinyl alcohol copolymer has improved high-speed coating ability when it is used as an adhesive. The block character is suitably 0.93 or more, more suitably 0.95 or more. With the block character being 0.99 or less, water-resistant adhesiveness is improved when the ethylene-vinyl alcohol copolymer is used as an adhesive.

The block character is a numerical value indicating distribution of vinyl alcohol units formed by saponification of ethylene units and vinyl ester units which has a value of 0 to 2. "0" indicates that ethylene units or vinyl alcohol units are distributed as a block. As the value increases, alternating property increases. "1" indicates that ethylene units and vinyl alcohol units are completely randomly present. "2" indicates that ethylene units and vinyl alcohol units are completely alternately present. The block character can be determined by $^{13}$C-NMR as described below. First, an ethylene-vinyl alcohol copolymer is saponified to a saponification degree of 99.9 mol % or more, fully washed with methanol, and dried at 90° C. under reduced pressure for 2 days. The completely saponified ethylene-vinyl alcohol copolymer obtained is dissolved in DMSO-$d_6$, and the resulting sample was subjected to measurement using a 500 MHz $^{13}$C-NMR spectrometer (JEOL GX-500) at 80° C.

Using a molar fraction of a vinyl alcohol-ethylene two-unit chain (AE), a molar fraction of vinyl alcohol units (A), and a molar fraction of ethylene units (E) assigned and calculated from the obtained spectrum as described in T. Moritani and H. Iwasaki, 11, 1251-1259, Macromolecules (1978), a block character (η) of ethylene units is determined according to the following equation:

$$\eta = (AE)/\{2 \times (A) \times (E)\}$$

An ethylene-vinyl alcohol copolymer having a block character of ethylene units as defined above can be produced by a special method comprising a polymerization step and a saponification step described later. After intense investigation, the inventors have achieved that a block character of ethylene units can be controlled by employing such a production method. We have further found that with a block character of ethylene units being within the above range, an ethylene-vinyl alcohol copolymer exhibiting improved high-speed coating ability and water-resistant adhesiveness can be obtained when it is used as an adhesive. An ethylene-vinyl alcohol copolymer of the present invention will be further detailed below.

(Vinyl Ester)

An ethylene-vinyl alcohol copolymer of the present invention is produced by copolymerizing ethylene and a vinyl ester to give an ethylene-vinyl ester copolymer and then saponifying the ethylene-vinyl ester copolymer. Examples of a vinyl ester which can be used include vinyl formate, vinyl acetate, vinyl propionate, vinyl valerate, vinyl caprate, vinyl laurate, vinyl stearate, vinyl benzoate, vinyl pivalate and vinyl versatate, particularly preferably vinyl acetate.

(Ethylene Unit Content)

A content of ethylene units in an ethylene-vinyl alcohol copolymer particle of the present invention is 1 mol % or more and less than 20 mol %. If a content of ethylene units is less than 1 mol %, an adhesive consisting of the aqueous solution obtained has insufficient water-resistant adhesiveness. A content of ethylene units is suitably 1.5 mol % or more, more suitably 2 mol % or more. If a content of ethylene units is 20 mol % or more, an ethylene-vinyl alcohol copolymer is insoluble in water, and preparation of an aqueous solution becomes difficult. A content of ethylene units is suitably 15 mol % or less, more suitably 10 mol % or less, further suitably 8.5 mol % or less.

A content of ethylene units is determined, for example, by $^1$H-NMR of a precursor of an ethylene-vinyl alcohol copolymer or an ethylene-vinyl ester copolymer as a re-acetylation product as described below. A sample of the ethylene-vinyl ester copolymer is reprecipitation-purified three or more times using a mixed solution of n-hexane and acetone, and dried at 80° C. for three days to prepare an ethylene-vinyl ester copolymer for analysis. The ethylene-vinyl ester copolymer is dissolved in DMSO-$d_6$ followed by $^1$H-NMR (500 MHz) analysis at 80° C. A content of ethylene units can be calculated using peaks derived from a main-chain methine of the vinyl ester (4.7 to 5.2 ppm) and peaks derived from a main-chain methylene of ethylene and the vinyl ester (0.8 to 1.6 ppm).

(Saponification Degree)

A saponification degree of ethylene-vinyl alcohol copolymer particles of the present invention is 80 to 99.7 mol %. If a saponification degree is less than 80 mol %, an aqueous solution of the ethylene-vinyl alcohol copolymer is less transparent and thus water-resistant adhesiveness of an adhesive consisting of an aqueous solution is insufficient. A saponification degree is suitably 82 mol % or more, more suitably 85 mol % or more. On the other hand, if a saponification degree is more than 99.7 mol %, an ethylene-vinyl alcohol copolymer cannot be stably produced and high-speed coating ability of an adhesive consisting of an aqueous solution is insufficient. A saponification degree is suitably 99.5 mol % or less, more suitably 99 mol % or less, further suitably 98.5 mol % or less. A saponification degree of an ethylene-vinyl alcohol copolymer particle can be determined in accordance with JIS K6726 (1994).
(Viscosity-Average Polymerization Degree)

A viscosity-average polymerization degree of an ethylene-vinyl alcohol copolymer of the present invention is 200 to 5000. If a viscosity-average polymerization degree less than 200, water-resistant adhesiveness of an adhesive consisting of an aqueous solution obtained is insufficient. A viscosity-average polymerization degree is suitably 250 or more, more suitably 300 or more, further suitably 400 or more. If a viscosity-average polymerization degree is more than 5000, an aqueous solution of an ethylene-vinyl alcohol copolymer becomes too viscous to be handled. A viscosity-average polymerization degree is suitably 4500 or less, more suitably 4000 or less, further suitably 3500 or less. A viscosity-average polymerization degree P can be determined in accordance with JIS K6726 (1994). Specifically, an ethylene-vinyl alcohol copolymer of the present invention is re-saponified to a saponification degree of 99.5 mol % or more and purified, and then P can be calculated by the following equation using a limiting viscosity [η] (L/g) as determined in water at 30° C.

$$P=([\eta]\times 10000/8.29)^{(1/0.62)}$$

(Other Monomer Units)

An ethylene-vinyl alcohol copolymer of the present invention can contain other monomer units other than vinyl alcohol units, ethylene units and vinyl ester units as long as the effects of the present invention are not impaired. Examples of such other monomer units include units derived from α-olefins such as propylene, n-butene and isobutylene; acrylic acid and salts thereof; acrylic acid esters; methacrylic acid and salts thereof; methacrylic acid esters; acrylamides; acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and salts or quaternary salts thereof, N-methylol acrylamide and derivatives thereof; methacrylamide; methacrylamide derivatives such as N-methylmethacrylamide, N-ethylmethacrylamide, methacrylamide propanesulfonic acid and salts thereof, methacrylamide propyldimethylamine and salts or quaternary salts thereof, N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids and salts or esters thereof such as maleic acid, itaconic acid and fumaric acid; vinylsilyl compounds such as vinyltrimethoxysilane; and isopropenyl acetate. A content of these other monomer units is, depending on an objective or use thereof, suitably 10 mol % or less, more suitably less than 5 mol %, further suitably less than 1 mol %, particularly suitably less than 0.5 mol %.

[Method for Producing an Ethylene-Vinyl Alcohol Copolymer]

A suitable method for producing an ethylene-vinyl alcohol copolymer of the present invention is a method for producing the ethylene-vinyl alcohol copolymer by reacting ethylene with a vinyl ester to give an ethylene-vinyl ester copolymer and then saponifying the ethylene-vinyl ester copolymer, comprising, in production of the ethylene-vinyl ester copolymer, (a) the step of contacting a solution containing the vinyl ester with an ethylene-containing gas while stirring the solution with a wide paddle blade in a polymerization tank such that an agitation power Pv per unit volume is 0.5 to 10 kW/m$^3$ and a Froude number Fr is 0.05 to 0.2.

By contacting a solution containing a vinyl ester with an ethylene-containing gas in such a manner, a block character of ethylene units of an ethylene-vinyl alcohol copolymer can be within the above range. There will be detailed the production method.

(Polymerization Step)

In the polymerization step, ethylene is reacted (copolymerized) with a vinyl ester to give an ethylene-vinyl ester copolymer. Copolymerization of ethylene and a vinyl ester is preferably conducted by a solution polymerization wherein ethylene and the vinyl ester are copolymerized in an organic solvent such as an alcohol. Examples of the alcohol include lower alcohols such as methanol and ethanol, particularly preferably methanol. An initiator used for the polymerization can be selected from known initiators such as azo initiators and peroxide initiators including 2,2'-azobis (isobutyronitrile), 2,2'-azobis(4-methoxy-2,4-dimethylvaleronitrile), 2,2'-azobis(2,4-dimethyl-valeronitrile), benzoyl peroxide and n-propyl peroxydicarbonate.

In the polymerization, a chain transfer agent can coexist for adjusting a viscosity-average polymerization degree of the resulting ethylene-vinyl ester copolymer. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol; thiocarboxylic acids such as thioacetic acid; and halogenated hydrocarbons such as trichloroethylene and perchloroethylene. Inter alia, aldehydes and ketones can be suitably used. The amount of the chain transfer agent depends on a chain transfer constant of the chain transfer agent added and a targeted viscosity-average polymerization degree of an ethylene-vinyl ester copolymer, and generally it is 0.1 to 10 parts by mass based on 100 parts by mass of a vinyl ester used.

Polymerization can be carried out by any style of continuous polymerization, batch polymerization and semi-batch polymerization. A polymerization reactor can be a continuous tank reactor, a batch reactor, a tube reactor or the like, preferably a continuous tank reactor.

There will be described a specific polymerization apparatus and a polymerization step using the apparatus with reference to FIGs. FIG. 1 is a schematic view of a polymerization apparatus used in Example 1. The apparatus is a continuous tank reactor in which a polymerization tank 1 is connected to a heat exchanger 2 via pipes 3, 4. In the heat exchanger 2, a vinyl ester can be brought into flow contact with ethylene.

A plurality of pipes pipe 5, 6, 7 are connected to the polymerization tank 1. The number and arrangement of the pipes are not limited to those shown in the figure. Ethylene, a polymerization initiator and an organic solvent are fed to the polymerization tank 1 via these pipes. A rate of a starting material introduced into the polymerization tank per unit time is preferably 0.1 to 20 parts by mass for ethylene, 1 to 100 parts by mass for an organic solvent, and 0.00001 to 1 part by mass for a polymerization initiator based on 100 parts by mass of a vinyl ester. In some cases, a vinyl ester and other monomers can be fed via these pipes. A reaction liquid in the polymerization tank 1 is continuously discharged from a reaction liquid outlet pipe 9 connected to the bottom of the polymerization tank 1.

The inside of the polymerization tank 1 is equipped with a stirrer 8 having a wide paddle blade as a stirring blade. While a solution containing a vinyl ester is stirred with the wide paddle blade, the solution is in contact with an ethylene-containing gas for reaction of ethylene with the vinyl ester, to give an ethylene-vinyl ester copolymer.

Figure 2:
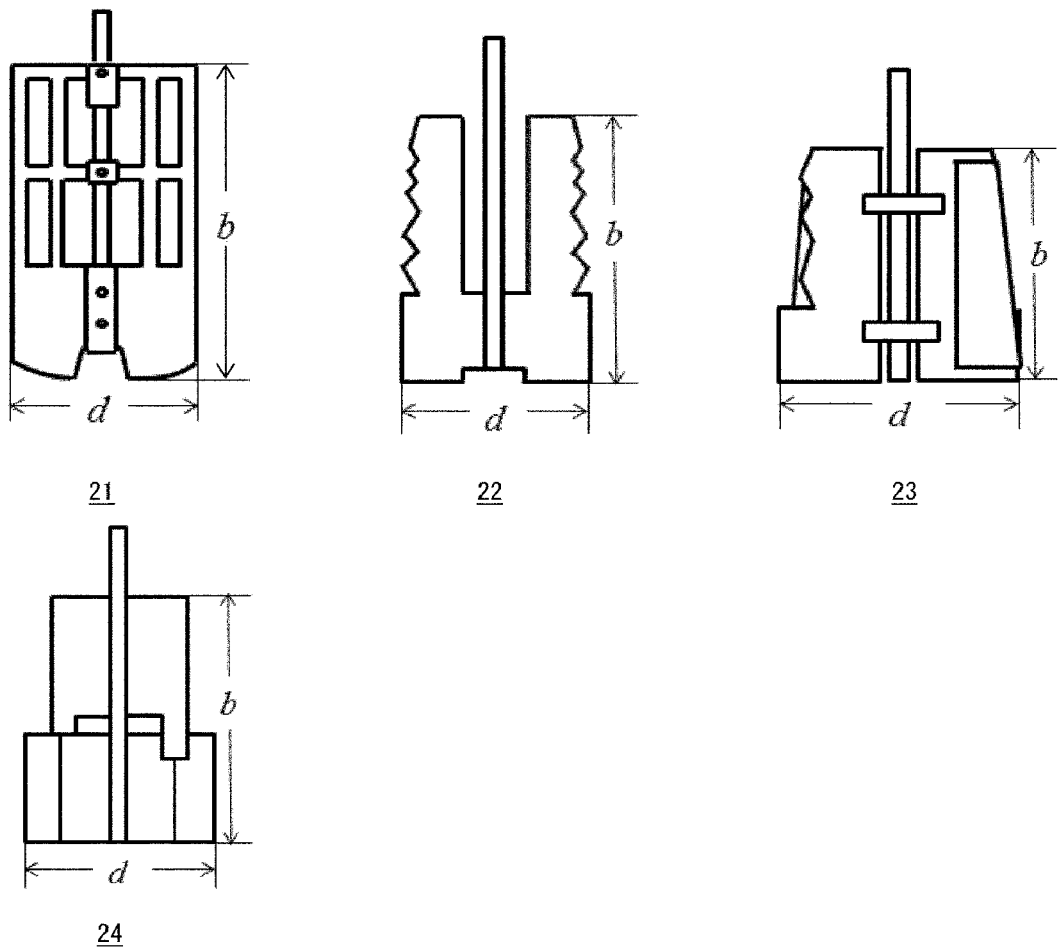
FIG. 2 is a schematic view of a wide paddle blade used in the present invention.

In the production method of the present invention, it is important to use a wide paddle blade as a stirring blade for stirring the solution containing a vinyl ester. FIG. 2 is a schematic view of a wide paddle blade used in the present invention. As shown in FIG. 2, a wide paddle blade is characterized in that it has a wide paddle with a width of "b". The width "b" of the wide paddle blade can be appropriately adjusted, depending on a volume of the polymerization tank 1 and the like, and is preferably 1 to 10 m as described later. By using such a paddle, the solution can be homogeneously mixed from the bottom to the liquid surface, and also ethylene can be efficiently absorbed by the solution containing a vinyl ester. The wide paddle blade can be of a single blade type (for example, Maxblend blade), or of a multi-blade type (for example, Fullzone blade). In the light of further efficient absorption of ethylene into the vinyl ester, it is preferable that during stirring the solution containing the vinyl ester, the liquid level of the solution is near the upper end of the stirring blade. Specific examples of the wide paddle blade include Maxblend blade (Sumitomo Heavy Industries Process Equipment Co., Ltd.), Fullzone blade (Kobelco Eco-Solutions Co., Ltd.), Sanmeler blade (Mitsubishi Heavy Industries), Hi-Fi mixer blade (Soken Chemical & Engineering Co., Ltd.), Supermix blade (Satake Chemical Equipment Mfg., Ltd., Supermix MR203, Supermix MR205), and Bendleaf blade (Hakko Sangyo Co., Ltd.).

An ethylene pressure in a polymerization reactor during polymerization is preferably 0.01 to 0.9 MPa, more preferably 0.05 to 0.8 MPa, further preferably 0.1 to 0.7 MPa. A polymerization rate at an outlet of a polymerization reactor is, but not limited to, preferably 10 to 90%, more preferably 15 to 85%.

A polymerization temperature is, but not limited to, preferably 0 to 180° C., more preferably 20 to 160° C., further preferably 30 to 150° C.

When ethylene is reacted with a vinyl ester, it is preferable to stir a solution containing a vinyl ester such that in a polymerization tank, an agitation power Pv per unit volume in the solution is 0.5 to 10 kW/m$^3$. If an agitation power is less than 0.5 kW/m$^3$, the amount of ethylene incorporated in a vinyl ester is insufficient and a reaction liquid is insufficiently homogeneous, so that an ethylene-vinyl alcohol copolymer having a block character of ethylene units within the above range cannot be obtained. An agitation power is more suitably 1 kW/m$^3$ or more, further suitably 1.5 kW/m$^3$ or more. If an agitation power is more than 10 kW/m$^3$, power used for operation becomes very large, which is industrially unfavorable. An agitation power is more suitably 7 kW/m$^3$ or less, further suitably 5 kW/m$^3$ or less. An agitation power Pv per unit volume for a solution containing a vinyl ester can be determined by a method described in Examples later.

Froude number Fr is a ratio of inertial force to gravity as defined by the following equation, which is an indicator for vortex shape in a liquid surface.

$$Fr = n^2 \times d/g$$

n: rotation number of a stirring blade (rps)
d: stirring blade diameter (m)
g: gravity acceleration (m/s$^2$)

When ethylene is reacted with a vinyl ester, it is preferable to stir a solution containing a vinyl ester such that in a polymerization tank, Froude number Fr is 0.05 to 0.2. By regulating Froude number Fr within the above range for controlling vortex shape in the liquid surface, ethylene is moderately absorbed by a vinyl ester, so that it would easily give an ethylene-vinyl alcohol copolymer having a block character of ethylene units within the above range. Froude number Fr is more suitably 0.06 or more, further suitably 0.07 or more. Froude number Fr is more suitably 0.18 or less, further suitably 0.15 or less. Froude number Fr can be controlled to be within the above range by appropriately varying a rotation number or a diameter of the stirring blade.

There are no particular restrictions to a stirring blade diameter "d" of the wide paddle blade as long as an agitation power Pv and Froude number Fr are within the above ranges, and it is preferably 0.5 to 5 m in the light of improvement in an ethylene absorption efficiency. A stirring blade diameter "d" is more preferably 0.75 m or more. A stirring blade diameter "d" is more preferably 4 m or less. A stirring blade diameter "d" is twice a distance from a rotation axis to the top of the blade (the farthest point from the rotation axis).

There are no particular restrictions to a width "b" (length in the height direction) of a wide paddle blade (paddle) which can be adjusted by a volume of a polymerization tank 1 or the like, and it is preferably 1 to 10 m in the light of improvement in an ethylene absorption efficiency. A width "b" is more preferably 1.5 m or more. A width "b" is more preferably 8 m or less.

There are no particular restrictions to a ratio of a width (paddle width) "b" to a stirring blade diameter "d" (b/d) in a wide paddle blade which can be determined depending on a shape of a polymerization tank 1 or the like, and it is preferably 1 or more. The ratio (b/d) is more preferably 1.5 or more. The ratio (b/d) is generally 2.5 or less.

A shape of a polymerization tank 1 is generally, but not limited to, almost columnar. In such a case, a wide paddle blade is placed in an almost columnar polymerization tank 1 such that a rotation axis of the polymerization tank 1 is aligned with a rotation axis of the wide paddle blade. There are no particular restrictions to a ratio of a stirring blade diameter "d" (m) to an inner diameter of the polymerization tank "D" (m) (d/D) as long as the effects of the present invention are not impaired. The ratio can be appropriately adjusted depending on a polymerization tank used, and generally 0.4 to 0.9. A volume of the polymerization tank is generally, but not limited to, 1 to 200 kL.

There are no particular restrictions to a rotation number "n" of the stirring blade which can be adjusted such that an agitation power Pv and Froude number Fr are within the above ranges, and it is preferably 0.5 to 1.35 rps. If a rotation number "n" is less than 0.5 rps, a polymerization solution tends to be supercooled near a heat transfer surface, so that a gelatinous material may be formed on the inner wall of the polymerization tank, leading to difficulty in prolonged operation. If a rotation number "n" is more than 1.35 rps, with a low-viscosity polymerization solution, the solution may splash and adhere to the inner wall of the gas-phase part in the polymerization tank. If such a deposit is solidified and mixed into the polymerization solution, it may lead to formation of foreign matter by which operation may be unstable.

Conventionally, in production of an ethylene-vinyl alcohol copolymer, an agitation power per unit volume which is an indicator of agitation strength is controlled. An agitation power is, however, influenced by various factors such as a volume, a viscosity and a density of a reaction liquid, a shape of a polymerization tank, as well as a shape and a rotation number of the stirring blade. Therefore, controlling an agitation power is insufficient for high level control of blocking property of ethylene units, resultantly leading to extension of an ethylene chain (blocking of ethylene units), and a block character of ethylene units in an ethylene-vinyl alcohol copolymer obtained is less than 0.90. Furthermore, extension of an ethylene chain results in stronger intermolecular hydrophobic interaction, leading to deterioration in high-speed coating ability. To solve the problem, the inventors have found, as a result of intense investigation, that a copolymer having a shorter ethylene chain (ethylene units are positioned at random) as compared with conventional technique can be obtained by proceeding a polymerization reaction under particular conditions, and have achieved improvement in high-speed coating ability.

In the light of further high level control of a block character of ethylene units, in the above production method, it is preferable that the polymerization tank is connected to a heat exchanger via a pipe, and the method further comprises, in production of the ethylene-vinyl ester copolymer, (b) the step of introducing an ethylene-containing gas present in a gas-phase part in the polymerization tank, into the heat exchanger; (c) the step of feeding a vinyl ester to the heat exchanger; (d) the step of contacting the vinyl ester with the ethylene-containing gas in the heat exchanger; and (e) the step of discharging the vinyl ester in which ethylene is dissolved, from the heat exchanger and introducing the vinyl ester into the polymerization tank. A vinyl ester can be directly, that is, not via a heat exchanger, fed to a polymerization tank. However, as described herein, by a procedure where ethylene is first absorbed by a vinyl ester in a heat exchanger and then fed to a polymerization tank, ethylene can be efficiently absorbed by the vinyl ester, so that a block character of ethylene units can be highly controlled. Although a part of a vinyl ester fed to a polymerization tank can be contacted with an ethylene-containing gas in a heat exchanger, it is preferable that the whole vinyl ester fed is contacted with an ethylene-containing gas in a heat exchanger.

There are no particular restrictions to a heat exchanger used, and a heat exchanger with a larger surface area is preferable in the light of efficient absorption of ethylene. Examples include a vertical wetted-wall heat exchanger, a vertical wetted-wall multitubular heat exchanger, and a heat exchanger in which a packed column type, a porous plate type or a bubble cap type absorber is equipped with a jacket and/or a coil. Among these, a vertical wetted-wall multitubular heat exchanger is more preferable.

In the apparatus shown in FIG. 1, a heat exchanger 2 is a vertical wetted-wall multitubular heat exchanger. To the heat exchanger 2 is connected a vinyl ester inlet pipe 10, through which a vinyl ester is fed to the upper part of the heat exchanger 2. The starting vinyl ester can be a vinyl ester alone or a mixed solution of the organic solvent and a vinyl ester, and the latter is preferable.

To the heat exchanger 2 shown in FIG. 1 are connected refrigerant pipes 11, 12. The positions of the pipes are not limited to those shown in the figure, and it is preferable that a refrigerant is fed from the refrigerant pipe 12 connected to the lower part of the heat exchanger 2 while being discharged from the refrigerant pipe 11 connected to the upper part of the heat exchanger 2. With such connections, the vinyl ester can be efficiently cooled, resulting in higher ethylene-absorption efficiency. Examples of a refrigerant include, but not limited to, an aqueous solution of an alcohol such as methanol, ethanol, ethylene glycol and glycerol; an aqueous solution of sodium chloride and calcium chloride; and Freons. In the light of handleability and cost, an aqueous solution of an alcohol, particularly an aqueous solution of methanol can be suitably used.

A gas discharge pipe 13 for discharging gases from the heat exchanger 2 is connected to the upper part of the heat exchanger 2. A mist separator (not shown) can be connected to the gas discharge pipe 13. Droplets in the discharged gas are removed by a mist separator, and mist-free ethylene can be collected or expelled. A mist separator is an apparatus for separating droplets suspended in a gas utilizing external force such as gravity, centrifugal force or electrostatic force, or shielding or sieving effect. Examples of a mist separator include a gravity settler, a cyclone, an electric dust collector, a scrubber, a bagfilter and a packed bed. Among these, a cyclone is preferable.

There are no particular restrictions to a method for contacting a vinyl ester with an ethylene-containing gas in the heat exchanger 2. For example, a vinyl ester flows down from the upper part of the heat exchanger 2 while a pressurized ethylene-containing gas is fed to the lower part of the heat exchanger, so that these are brought into countercurrent contact in the heat exchanger 2; or alternatively, a vinyl ester flows down from the upper part of the heat exchanger 2 while a pressurized ethylene-containing gas is fed to the upper part of the heat exchanger, so that these are brought into co-current contact in the heat exchanger 2. In the light of efficient ethylene absorption, the former is preferable.

In the apparatus shown in FIG. 1, a polymerization tank 1 is connected to a heat exchanger 2 via two pipes 3, 4. An ethylene-containing gas is introduced from the polymerization tank 1 through the pipe 3 to the lower part of the heat exchanger 2, and the vinyl ester having absorbed ethylene is introduced from the lower part of the heat exchanger 2 through the pipe 4 to the polymerization tank 1.

The vinyl ester is fed through an inlet pipe 10 to the heat exchanger 2. The vinyl ester introduced into the upper part of the heat exchanger 2 absorbs ethylene while passing through the heat exchanger 2.

The ethylene-containing gas is introduced through the pipe 3 connected to the lower part of the heat exchanger 2 into the heat exchanger 2. The pipe 3 on the heat exchanger side is connected to the lower part of the heat exchanger 2, while the vinyl ester inlet pipe 10 is connected to the upper part of the heat exchanger 2. The ethylene-containing gas flows up in the heat exchanger 2 while being brought into countercurrent contact with the vinyl ester. As a result, ethylene in the gas is dissolved in the vinyl ester.

The vinyl ester having absorbed ethylene is introduced through the pipe 4 into the polymerization tank 1. For continuous production, ethylene is circulated in the polymerization tank 1, the heat exchanger 2 and pipes 3, 4. Some of ethylene is contained in the vinyl ester, which is discharged from the reaction liquid outlet pipe 9. Therefore, ethylene is replenished via at least one of pipes 5, 6, 7 from an ethylene supply source connected to the polymerization tank 1.

(Saponification Step)

An ethylene-vinyl alcohol copolymer is produced by saponifying the ethylene-vinyl ester copolymer obtained in the polymerization step. Here, it is preferable to saponify the ethylene-vinyl ester copolymer by alcoholysis or hydrolysis in the presence of a catalyst in an organic solvent. Examples of a catalyst used in the saponification step include basic catalysts such as sodium hydroxide, potassium hydroxide and sodium methoxide; and acidic catalysts such as sulfuric acid, hydrochloric acid and p-toluenesulfonic acid. Examples of an organic solvent used in the saponification step include, but not limited to, alcohols such as methanol and ethanol; esters such as methyl acetate and ethyl acetate; ketones such as acetone and methyl ethyl ketone; and aromatic hydrocarbons such as benzene and toluene. These can be used alone or in combination of two or more. Among these, it is convenient and preferable that saponification reaction is conducted in the presence of sodium hydroxide as a basic catalyst using methanol or a mixed solution of methanol and methyl acetate as a solvent. The amount of the saponification catalyst is preferably 0.001 to 0.5 as a molar ratio to vinyl ester units in the ethylene-vinyl ester copolymer. The molar ratio is more suitably 0.002 or more. The molar ratio is more suitably 0.4 or less, further suitably 0.3 or less.

After the saponification step, a pulverization step and a drying step can be conducted. The pulverization step can be divided into a pre-pulverization step and a main pulverization step. After the saponification step, if necessary, a washing step can be further conducted for removing impurities such as sodium acetate.

(Compound Having a Conjugated Double Bond)

In the light of improving high-speed coating ability, a suitable embodiment of the present invention is an ethylene-vinyl alcohol copolymer composition comprising the ethylene-vinyl alcohol copolymer and a compound having a conjugated double bond with a molecular weight of 1000 or less, wherein a content of the compound is 0.000001 to 0.01 parts by mass based on 100 parts by mass of the ethylene-vinyl alcohol copolymer. Although a mechanism of improvement in high-speed coating ability is not clearly understood, it can be assumed that a conjugated double bond moiety interacts with an ethylene unit in an ethylene-vinyl alcohol copolymer in a polar solvent so that it moderately inhibits intermolecular interaction between ethylene-vinyl alcohol copolymers.

In the present invention, a compound having a conjugated double bond with a molecular weight of 1000 or less is a compound having a compound having a conjugated double bond of aliphatic double bonds, or a compound having a conjugated double bond of an aliphatic double bond and an aromatic ring. In the light of more effective improvement of high-speed coating ability and/or water-resistant adhesiveness, the former is preferable. The molecular weight is 1000 or less, preferably 800 or less, more preferably 500 or less.

A compound having a conjugated double bond of aliphatic double bonds is a compound having a conjugated double bond having a structure where carbon-carbon double bonds and carbon-carbon single bonds are alternately connected, wherein two or more carbon-carbon double bonds are present. Specific examples include a conjugated diene compound having a conjugated structure where two carbon-carbon double bonds and one carbon-carbon single bond are alternately connected; a conjugated triene compound having a conjugated structure where three carbon-carbon double bonds and two carbon-carbon single bonds are alternately connected (for example, 2,4,6-octatriene), and a conjugated polyene compound having a conjugated structure where a more number of carbon-carbon double bonds and carbon-carbon single bonds are alternately connected. Particularly, in the light of higher improving effect of high-speed coating ability and water-resistant adhesiveness, a conjugated diene compound is preferable. A compound having a conjugated double bond with a molecular weight of 1000 or less used in the present invention can have independently of each other a plurality of conjugated double bonds in one molecule; for example, a compound having three conjugated trienes in the same molecule such as wood oil can be included.

A compound having a conjugated double bond with a molecular weight of 1000 or less can have another functional group other than a conjugated double bond. Examples of the other functional group include a carboxy group and salts thereof, a hydroxy group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, a polar group such as a halogen atom, and a nonpolar group such as a phenyl group. In the light of more effective improvement in high-speed coating ability and/or water-resistant adhesiveness, the other functional group is preferably a polar group, more preferably a carboxy group and salts thereof, and a hydroxy group. The other functional group can be directly bonded to a carbon atom in a conjugated double bond, or bonded at a position apart from a conjugated double bond. A multiple bond in the other functional group can be at such a position that it can be conjugated with the conjugated double bond; for example, 1-phenyl-1,3-butadiene having a phenyl group or sorbic acid having a carboxy group can be used as the compound having a conjugated double bond. The compound having a conjugated double bond with a molecular weight of 1000 or less can have an unconjugated double bond or an unconjugated triple bond.

Specific examples of the compound having a conjugated double bond with a molecular weight of 1000 or less include a compound having a conjugated double bond of aliphatic double bonds such as 2,3-dimethyl-1,3-butadiene, 4-methyl-1,3-pentadiene, 1-phenyl-1,3-butadiene, sorbic acid and myrcene; and a compound having a conjugated double bond of an aliphatic double bond and an aromatic ring such as 2,4-diphenyl-4-methyl-1-pentene, α-methylstyrene polymer and 1,3-diphenyl-1-butene.

A content of a compound having a conjugated double bond with a molecular weight of 1000 or less in the ethylene-vinyl alcohol copolymer composition is preferably 0.000001 to 0.01 parts by mass based on 100 parts by mass of the ethylene-vinyl alcohol copolymer. The content is more suitably 0.000002 parts by mass or more, further suitably 0.000003 parts by mass or more. The content is more suitably 0.0075 parts by mass or less, further suitably 0.005 parts by mass or less, particularly suitably 0.0025 parts by mass or less.

In the present invention, there are no particular restrictions to a method for adding a compound having a conjugated double bond with a molecular weight of 1000 or less. Examples include 1) a method where the compound is added to an ethylene-vinyl ester copolymer obtained followed by saponification; 2) a method where an ethylene-vinyl ester copolymer is saponified while the compound is added; 3) a method where a solution containing the compound is sprayed over an ethylene-vinyl alcohol copolymer; 4) a method where an ethylene-vinyl alcohol copolymer is immersed in a solution containing the compound followed by drying; 5) a method where an aqueous solution containing an ethylene-vinyl alcohol copolymer and the compound is prepared and then dried; and 6) a method where an aqueous solution containing an ethylene-vinyl alcohol copolymer and the compound is prepared and used for a variety of applications. Among these, the method 6) is preferable in the light of convenience in adjusting a content of the compound.

It is preferable that the ethylene-vinyl alcohol copolymer composition further contains an inorganic filler. The inorganic filler can be selected from those used for an adhesive as described later. A content of the inorganic filler is preferably 20 to 500 parts by mass based on 100 parts by mass of the ethylene-vinyl alcohol copolymer. The content is more suitably 50 parts by mass or more. The content is more suitably 300 parts by mass or less.

Without impairing the effects of the present invention, the ethylene-vinyl alcohol copolymer composition can contain other additives other than the ethylene-vinyl alcohol copolymer, the compound having a conjugated double bond with a molecular weight of 1000 or less and the inorganic filler. The other additives can be those described as an additive used for an adhesive described later. The total content of the other additives is suitably 100 parts by mass or less, more suitably 50 parts by mass or less, further suitably 25 parts by mass or less, particularly suitably 10 parts by mass or less based on 100 parts by mass of the ethylene-vinyl alcohol copolymer.

(Aqueous Solution)

An aqueous solution containing the ethylene-vinyl alcohol copolymer is a suitable embodiment of the present invention. The aqueous solution is used for various applications such as an adhesive, a dispersion stabilizer, a coating agent, a binder, a viscosity modifier, a molding material for a film and the like, and a resin material for a post-reaction. Among these, an adhesive consisting of the aqueous solution is a more suitable embodiment of the present invention.

A content of components (solid) other than water and a water-soluble organic solvent is preferably 1 to 50% by mass. The content is more preferably 3% by mass or more, further preferably 5% by mass or more. The content is more preferably 45% by mass or less, further preferably 40% by mass or less.

The aqueous solution preferably contains a compound having a conjugated double bond with a molecular weight of 1000 or less. A content of the compound is preferably 0.000001 to 0.01 parts by mass based on 100 parts by mass of the ethylene-vinyl alcohol copolymer. The content is more suitably 0.000002 parts by mass or more, further suitably 0.000003 parts by mass or more. The content is more suitably 0.0075 parts by mass or less, further suitably 0.005 parts by mass or less, particularly suitably 0.0025 parts by mass or less.

The aqueous solution preferably further contains an inorganic filler. The inorganic filler can be selected from those used for an adhesive as described later. A content of the inorganic filler is preferably 20 to 500 parts by mass based on 100 parts by mass of the ethylene-vinyl alcohol copolymer. The content is more suitably 50 parts by mass or more. The content is more suitably 300 parts by mass or less.

Without impairing the effects of the present invention, the aqueous solution can contain other additives other than the ethylene-vinyl alcohol copolymer, the compound having a conjugated double bond with a molecular weight of 1000 or less, the inorganic filler and water. The other additives can be selected from those described as an additive used for an adhesive described later. The total content of the other additives is suitably 100 parts by mass or less, more suitably 50 parts by mass or less, further suitably 25 parts by mass or less, particularly suitably 10 parts by mass or less based on 100 parts by mass of the ethylene-vinyl alcohol copolymer.

The aqueous solution can contain an antifreezing agent; and a water-soluble organic solvent including an alcohol such as methanol, ethylene glycol and glycerol and cellosolve for the purpose of endowing an adhesive layer formed when the aqueous solution is used as an adhesive, with flexibility. A content of the organic solvent is suitably 100 parts by mass or less, more suitably 50 parts by mass or less, further suitably 10 parts by mass or less based on 100 parts by mass of water.

(Adhesive)

An adhesive consisting of the aqueous solution containing the ethylene-vinyl alcohol copolymer is a suitable embodiment of the present invention. The adhesive preferably contains an inorganic filler. There are no particular restrictions to the inorganic filler, which can be appropriately selected depending on an adherend, a coater, required performance and the like. Examples of the inorganic filler include clays such as kaolinite, halloysite, pyrophyllite and sericite; heavy, light or surface-treated calcium carbonate, aluminum hydroxide, aluminum oxide, gypsums, talc and titanium oxide. Among these, clay is preferable. These inorganic fillers can be used alone or in combination of two or more. In the light of providing a homogeneous slurry solution without aggregation or settling of the inorganic filler in an aqueous solution, an average particle size of the inorganic filler is preferably 10 μm or less, more preferably 8 μm or less, further preferably 5 μm or less.

A content of the inorganic filler in the adhesive is suitably 20 to 500 parts by mass based on 100 parts by mass of the ethylene-vinyl alcohol copolymer. If a content of the inorganic filler is less than 20 parts by mass, there are tendencies to delay of development of initial adhesion force and reduction of balanced adhesive power, shear stress or creep resistance. The content is more suitably 50 parts by mass or more. If a content of the inorganic filler is more than 500 parts by mass, there are tendencies that fluidity of an adhesive is deteriorated, an inorganic filler is easily settled in the aqueous solution, and adhesive power is reduced. The content is more suitably 300 parts by mass or less.

As long as the effects of the present invention are not impaired, the adhesive can contain other additives other than the ethylene-vinyl alcohol copolymer, the compound having a conjugated double bond with a molecular weight of 1000 or less, the inorganic filler and water. Examples of the other additives include an inorganic dispersing agent including metal salts of a phosphoric acid compound such as sodium polyphosphate and sodium hexametaphosphate, and liquid glass; polyacrylic acid and salts thereof; sodium alginate; anionic polymer compound and metal salts thereof such as an α-olefin-maleic anhydride copolymer; and nonionic surfactants such as an ethylene oxide adduct of a higher alcohol and a copolymer of ethylene oxide and propylene oxide. By adding these, fluidity of an adhesive is improved. Furthermore, as necessary, other additives can be added, including carboxymethylcellulose, polyethylene oxide, a defoamer, an antiseptic, an antifungal agent, a coloring pigment, a deodorant, and a fragrance. For further improvement of adhesive powder, water-soluble boron compounds such as boric acid; borax; and a boric acid ester of a polyol including glycerol and ethylene glycol can be added. Furthermore, other additives can be added, including natural sizing agents such as starch, casein, gelatin, guar gum, gum arabic and sodium alginate; processed natural sizing agents such as CMC, oxidized starch and methylcellulose; synthetic resin emulsions such as acrylic emulsion, polyvinyl acetate emulsion, ethylene-vinyl acetate copolymer emulsion and SBR latex; and various rubber latexes. As long as the effects of the present invention are not impaired, a known PVA can be combined as the other additive. The total content of the other additives is suitably 100 parts by mass or less, more suitably 50 parts by mass or less, further suitably 25 parts by mass or less, particularly suitably 10 parts by mass or less, based on 100 parts by mass of the ethylene-vinyl alcohol copolymer.

There are no particular restrictions to a production method for the adhesive; for example, it can be provided by dissolving the ethylene-vinyl alcohol copolymer in water. Specifically, it can be provided by adding the ethylene-vinyl alcohol copolymer, and, as necessary, the compound having a conjugated double bond with a molecular weight of 1000 or less, inorganic filler or other additives to water, and then dissolving the ethylene-vinyl alcohol copolymer. For producing the adhesive, both batch type and continuous type can be employed. When a compound having a conjugated double bond with a molecular weight of 1000 or less, an inorganic filler or another additive is added, (i) the ethylene-vinyl alcohol copolymer and the compound having a conjugated double bond with a molecular weight of 1000 or less, the inorganic filler or the other additive can be premixed and then the resulting mixture can be added to water, or (ii) the ethylene-vinyl alcohol copolymer, and the compound having a conjugated double bond with a molecular weight of 1000 or less, the inorganic filler or the other additive can be added in sequence. When each component is added to water, water is preferably stirred. A slurry obtained by adding the ethylene-vinyl alcohol copolymer, and, as necessary, a compound having a conjugated double bond with a molecular weight of 1000 or less, an inorganic filler or another additive to water is heated to dissolve the ethylene-vinyl alcohol copolymer. Here, an arbitrary heating type can be employed, including heating with direct steam blow-in and indirect heating with a jacket.

A viscosity of an adhesive of the present invention can be adjusted depending on an application, and it is preferable that a viscosity measured by a B-type viscometer (30 rpm, 20° C.) is 100 to 8000 mPa·s.

An adhesive of the present invention, which is resistant to jumping or bubble intrusion, can be homogeneously cast, and is excellent in high-speed coating ability and water-resistant adhesiveness because of less stringing. It can be, therefore, suitably used for known applications for which a PVA-containing adhesive has been conventionally used. For example, the adhesive is suitably used as an adhesive for paper such as paper board, cardboard, paper core, Fusuma and wallpaper. A method for applying the adhesive to a substrate is a suitable embodiment of the adhesive.

(Other Applications)

An ethylene-vinyl alcohol copolymer of the present invention can be used for various applications, non-limiting examples of which will be described below.

(1) Application for dispersant for vinyl chlorides: a dispersion stabilizer for suspension polymerization and a dispersion aid for vinyl chloride and vinylidene chloride, (2) Application for covering agent: a sizing, a fiber finishing agent, a leather finishing agent, a paint, an anti-fogging agent, a metal corrosion inhibitor, a brightening agent for zinc plating, an antistatic agent, (3) Application for adhesive/binder: an adhesive, a sticking agent, a remoistening adhesive, various binders, and additive for a cement and a mortar, (4) Application for dispersion stabilizer: a dispersion stabilizer for an organic or inorganic pigment such as a paint and an adhesive; a dispersion stabilizer for emulsion polymerization for various vinyl compounds; and a post-emulsifier such as Bitumen.

(5) Application for agriculture: an agrochemical binder, an agrochemical spreader, an agrochemical coating, a soil conditioner, an anti-erosion agent, and an agrochemical dispersion, (6) Application for medicines and cosmetics: a granulating binder, a coating agent, an emulsifier, a patch, a binder, a film preparation substrate, and a film-forming agent, (7) Application for viscosity modifier: a thickener and a rheology modifier, (8) Application for flocculant: a flocculant for aquatic suspended matter and dissolved matter and a metal flocculant, (9) Application for film: a water-soluble film, a polarizing film, a barrier film, a film for wrapping a textile product, a seed-growing sheet, a vegetation sheet, a seed tape, and a hygroscopic sheet,

(10) Application for shaped article: a fiber, a sheet, a pipe, a tube, a leakage prevention film, a water-soluble fiber for a chemical lace and a sponge,

(11) Application for resin raw material: a raw material for a polyvinyl butyral, a raw material for a photosensitive resin, a raw material for a graft polymer, and a raw material for various gels. and

(12) Application for post-reaction: post-reaction with a low-molecular organic compound, a macromolecular organic compound or an inorganic compound.

EXAMPLES

Next, there will be further specifically described the present invention with reference to, but not limited to, Examples. In Examples and Comparative Examples below, "part(s)" and "%" are, unless otherwise indicated, on a mass basis. A viscosity of an adhesive in the description below is a value as measured at a temperature of 20° C. and a rotor rotation number of 30 rpm using a B-type viscometer (TYPE:LV T) from Brookfield Engineering.

Physical property values of an ethylene-vinyl alcohol copolymer produced by the following production method were measured as described below.

[Viscosity-Average Polymerization Degree and Saponification Degree of an Ethylene-Vinyl Alcohol Copolymer]

A viscosity-average polymerization degree and a saponification degree of an ethylene-vinyl alcohol copolymer were determined in accordance with a method described in JIS K6726 (1994).

[Block Character of Ethylene Units of an Ethylene-Vinyl Alcohol Copolymer]

An ethylene-vinyl alcohol copolymer was saponified to a saponification degree of 99.9 mol % or more, thoroughly washed with methanol, and then dried at 90° C. under reduced pressure for 2 days. The resulting copolymer was dissolved in DMSO-$d_6$ and analyzed by 600 MHz $^{13}$C-NMR at 80° C. Using a molar fraction of a vinyl alcohol-ethylene two-unit chain (AE), a molar fraction of vinyl alcohol units (A), and a molar fraction of ethylene units (E) assigned and calculated from the obtained spectrum as described in T. Moritani and H. Iwasaki, 11, 1251-1259, Macromolecules (1978), a block character ($\eta$) of ethylene units was determined according to the following equation:

$$\eta = (AE)/\{2 \times (A) \times (E)\}$$

An agitation power Pv per unit volume (kW/m$^3$) was calculated from the following equation, wherein Pt is an agitation power (kW) during polymerization; Pe is an agitation power (kW) under no load (a polymerization tank is empty); and V is the amount of a polymerization solution in a polymerization reactor (m³).

$$Pv=(Pt-Pe)/V$$

Pe and Pt in the above equation were calculated from a current (A) and a voltage (V) of a stirrer according to the following equation, respectively.

$$Pe(\text{or } Pt)=3^{1/2} \times \text{voltage} \times \text{Current} \times \text{Power factor} \times \text{Efficiency}/1000$$

Inorganic fillers used were as follows.

Inorganic filler 1; kaolinite clay "ASP-200" (average particle size: 0.55 μm) from Engelhardt Corporation Inorganic filler 2; kaolinite clay "Huber-900" (average particle size: 0.6 μm) from Huber Corporation Inorganic filler 3; heavy calcium carbonate "Whiton P-30" (average particle size: 1.75 μm) from Shiraishi Kogyo Kaisha, Ltd.

(High-Speed Coating Ability)

Figure 3:
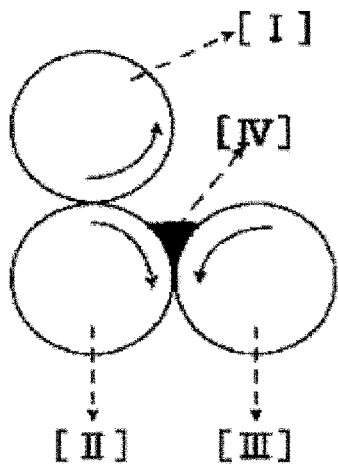
FIG. 3 is a schematic view of three rolls used for evaluation of an adhesive in Examples.

Adhesives obtained in Examples and Comparative Examples were evaluated using three rolls. FIG. 3 shows the three rolls used. A surface temperature of each roll was adjusted to 30° C. An adjusted adhesive [IV] was added between roll [II] and roll [III] and these were rotated such that a surface speed of roll [I] was 100 m/min, and the following items were evaluated.

(1) Jumping: whether droplets of an adhesive splashed from between roll [I] and roll [II] was visually observed and judged in accordance with the following criteria.

A; No droplets splashed.

B; A small number of droplets splashed.

C; A number of droplets splashed.

(2) Roll transfer: Whether an adhesive was uniformly transferred to roll [I] was visually judged.

A; Uniform

B; Nonuniform (3) Foaming:

The three rolls were rotated for 5 min. Bubble intrusion of an adhesive [IV] was evaluated from a ratio of a mass of 100 mL of the adhesive [IV] after roll rotation to a mass of 100 mL of the adhesive [IV] before roll rotation (mass after rotation/mass before rotation).

(4) Stringing: For an adhesive, stringing property between roll [I] and roll [II] was visually judged in accordance with the following criteria.

A; Stringing was not observed.

B; Stringing was observed.

(Water-Resistant Adhesiveness)

An adhesive obtained in Examples and Comparative Examples was applied to craft papers using a flat bar (50 μm and 75 μm), and immediately the craft papers were bonded together and then aged under the conditions of 20° C. and 65% RH for 24 hours. The craft paper laminate was immersed in water at 20° C. for 24 hours. After immersion, the adhesion part was peeled and judged from the state in accordance with the following criteria.

A; The craft papers failed to be peeled in the whole adhesion part and the craft papers themselves were ruptured.

B; The craft papers failed to be peeled in a part of the adhesion part and the craft papers themselves were ruptured.

C; The craft papers were peeled in the whole adhesion part.

Example 1

(Production of Copolymer 1)

FIG. 1 schematically shows a polymerization apparatus used. To a generally cylindrical polymerization tank 1 [volume: 7 kL, tank inner diameter D: 1.8 m] equipped with Fullzone blade [from Kobelco Eco-Solutions Co., Ltd., stirring blade diameter (diameter) d: 1.1 m, blade (paddle) width b: 1.5 m] as a stirring blade 8 were fed ethylene at such a rate that an inner ethylene pressure was 0.23 MPa, and a 1% by mass solution of 2,2'-azobis-(4-methoxy-2,4-dimethylvaleronitrile) as a polymerization initiator in methanol at a rate of 3 L/hr from pipe 5 and pipe 6, respectively. Furthermore, via an inlet pipe 10 and a heat exchanger 2, a solution containing vinyl acetate (vinyl acetate: 777 L/hr, methanol: 170 L/hr) was introduced into the polymerization tank 1. An ethylene-containing gas was introduced from polymerization tank 1 through pipe 3 into a heat exchanger 2. While flowing down along the pipe, the solution containing vinyl acetate absorbs ethylene, and poured into polymerization tank 1 via pipe 4, to be mixed with a reaction liquid and subjected to continuous polymerization with ethylene. The polymerization solution was continuously removed through pipe 9 at such a rate that the solution level in polymerization tank 1 was kept constant. Furthermore, the conditions were regulated so that a polymerization degree of vinyl acetate at the outlet of polymerization tank 1 was 30%. Furthermore, the conditions were regulated so that an agitation power per unit volume Pv was 3.1 kW/m³ and Froude number Fr was 0.15. While the reaction liquid was stirred, the whole blade (paddle) was immersed in the reaction liquid and the solution level was close to the upper end of the blade (paddle). A residence time of the reaction liquid in the polymerization tank was 5 hours. A temperature of the outlet of the polymerization tank was 60° C. Methanol vapor was introduced into the continuously removed polymerization solution to remove the unreacted vinyl acetate monomer, giving a solution of an ethylene-vinyl acetate copolymer in methanol (concentration: 32%).

To a solution of an ethylene-vinyl acetate copolymer in methanol (concentration: 32% by mass) obtained in the above polymerization step was added a solution of sodium hydroxide as a saponification catalyst in methanol (concentration: 4% by mass) such that a molar ratio of sodium hydroxide to vinyl acetate units in the ethylene-vinyl acetate copolymer was 0.012. The ethylene-vinyl acetate copolymer solution and the saponification catalyst solution were mixed by a static mixer, and then the resulting mixture was placed on a belt while being retained at 40° C. for 18 min to proceed saponification reaction. Subsequently, pulverization and drying were conducted to give an ethylene-vinyl alcohol copolymer. The copolymer thus obtained had an ethylene unit content of 2 mol %, a viscosity-average polymerization degree of 1700, a saponification degree of 98.5 mol %, and a block character of ethylene units of 0.95.

(Production of an Adhesive)

The ethylene-vinyl alcohol copolymer powder thus obtained (32 parts) and inorganic filler 2 (68 parts) were thoroughly dry-blended, and then poured into water (331 parts, 20° C.) with stirring. Furthermore, 2,4-diphenyl-4-methyl-1-pentene (DPMP) as a compound having a conjugated double bond with a molecular weight of 1000 or less was poured into water in the amount of 0.004 parts by mass based on 100 parts by mass of the ethylene-vinyl alcohol copolymer, and the mixture was heated to 95° C. to dissolve the ethylene-vinyl alcohol copolymer, giving an adhesive. The adhesive obtained had a solid concentration of 23.2%, and a viscosity of 1270 mPa·s at 20° C. and 30 rpm. The adhesive obtained was evaluated for high-speed coating ability and water-resistant adhesiveness by the above methods. The results are shown in Table 2.

Examples 2 to 6, and 8 to 10, and Comparative Example 2, 3 and 6

(Production of an Ethylene-Vinyl Acetate Copolymer)

An ethylene-vinyl alcohol copolymer was produced as described in Example 1, except that feed rates of ethylene, vinyl acetate, methanol and an initiator, a polymerization rate, an agitation power Pv, a Froude number Fr in polymerization, as well as a concentration of the ethylene-vinyl ester copolymer solution and a molar ratio of sodium hydroxide in saponification were changed as shown in Table 1, and a stirring blade 8 was a Maxblend blade [Sumitomo Heavy Industries Process Equipment Co., Ltd., stirring blade diameter (diameter) d: 1 m, blade (paddle) width b: 2 m].

(Production of an Adhesive)

An adhesive was produced and evaluated as described in Example 1, except that the type of an ethylene-vinyl alcohol copolymer used, the type of an inorganic filler, a compound having a conjugated double bond with a molecular weight of 1000 or less and a content thereof, as well as a solid concentration were changed as shown in Table 2. The results are shown in Table 2.

Example 7

(Production of an Ethylene-Vinyl Acetate Copolymer)

To polymerization tank 1 equipped with Maxblend blade [Sumitomo Heavy Industries Process Equipment Co., Ltd., stirring blade diameter (diameter) d: 1 m, blade (paddle) width b: 2 m] as a stirring blade 8 were fed ethylene at such a rate that an inner ethylene pressure was 0.27 MPa, and a 1% by mass solution of 2,2′-azobis-(4-methoxy-2,4-dimethylvaleronitrile) as a polymerization initiator in methanol at a rate of 1.8 L/hr from pipe 5 and pipe 6, respectively. Furthermore, through an inlet pipe 7, a solution containing vinyl acetate (vinyl acetate: 906 L/hr, methanol: 42 L/hr) was introduced into polymerization tank 1. The polymerization solution was continuously removed through pipe 9 at such a rate that the solution level in polymerization tank 1 was kept constant. Furthermore, the conditions were regulated so that a polymerization degree at the outlet of polymerization tank 1 was 24%. Furthermore, the conditions were regulated so that an agitation power Pv was 4 kW/m$^3$ and Froude number Fr was 0.16. A residence time of the reaction liquid in the polymerization tank was 5 hours. A temperature of the outlet of the polymerization tank was 60° C. Methanol vapor was introduced into the continuously removed polymerization solution to remove the unreacted vinyl acetate monomer, giving a solution of an ethylene-vinyl acetate copolymer in methanol (concentration: 25%).

To a solution of an ethylene-vinyl ester copolymer in methanol (concentration: 25% by mass) obtained in the above polymerization step was added a solution of sodium hydroxide as a saponification catalyst in methanol (concentration: 4% by mass) such that a molar ratio of sodium hydroxide to vinyl acetate units in the ethylene-vinyl acetate copolymer was 0.022. The ethylene-vinyl ester copolymer solution and the saponification catalyst solution were mixed by a static mixer, and then the resulting mixture was placed on a belt while being retained at 40° C. for 18 min to proceed a saponification reaction. Subsequently, pulverization and drying were conducted to give an ethylene-vinyl alcohol copolymer. The copolymer thus obtained had an ethylene unit content of 2 mol %, a viscosity-average polymerization degree of 2800, a saponification degree of 99.5 mol %, and a block character of ethylene units of 0.93.

(Production of an Adhesive)

An adhesive was produced and evaluated as described in Example 1, except that the type of an ethylene-vinyl alcohol copolymer used, the type of an inorganic filler, a compound having a conjugated double bond with a molecular weight of 1000 or less and a content thereof, as well as a solid concentration were changed as shown in Table 2. The results are shown in Table 2.

Comparative Example 1

Various ethylene-vinyl alcohol copolymers were produced as described in Example 7, except that feed rates of ethylene, vinyl acetate, methanol and an initiator, a polymerization rate, an agitation power per unit volume Pv, a Froude number Fr in polymerization, as well as a concentration of the ethylene-vinyl ester copolymer solution and a molar ratio of sodium hydroxide in saponification were changed as shown in Table 1, and a stirring blade 8 was a two-stage inclined paddle blade [stirring blade diameter (diameter) d: 1.5 m, blade (paddle) width b: 0.88 m]. Here, the two-stage inclined paddle blade does not correspond to a wide paddle blade because its blade (paddle) width b is small.

(Production of an Adhesive)

An adhesive was produced and evaluated as described in Example 1, except that the type of an ethylene-vinyl alcohol copolymer used, a compound having a conjugated double bond with a molecular weight of 1000 or less and a content thereof, as well as a solid concentration were changed as shown in Table 2. The results are shown in Table 2.

Comparative Example 4, 5

Various ethylene-vinyl alcohol copolymers were produced as described in Example 1, except that feed rates of ethylene, vinyl acetate, methanol and an initiator, a polymerization rate, an agitation power per unit volume Pv, a Froude number Fr in polymerization, as well as a concentration of the ethylene-vinyl ester copolymer solution and a molar ratio of sodium hydroxide in saponification were changed as shown in Table 1, and a stirring blade 8 was an anchor blade [stirring blade diameter (diameter) d: 1.7 m, blade (paddle) width b: 0.85 m]. Here, the anchor blade does not correspond to a wide paddle blade because its blade (paddle) width b is small.

(Production of an Adhesive)

An adhesive was produced and evaluated as described in Example 1, except that the type of an ethylene-vinyl alcohol copolymer used, a compound having a conjugated double bond with a molecular weight of 1000 or less and a content thereof, as well as a solid concentration were changed as shown in Table 2. The results are shown in Table 2. The ethylene-vinyl alcohol copolymer of Comparative Example 5 was insoluble in water, so that an adhesive could not be produced or evaluated.

TABLE 1

| | Polymerization conditions | | | | | | | | Saponification conditions | |
|---|---|---|---|---|---|---|---|---|---|---|
| | Ethylene Mpa | Vinyl acetate L/hr | Methanol L/hr | Initiator L/hr | Polymerization rate % | Stirring blade — | Agitation power Pv kW/m³ | Froude number Fr — | Feeding of vinyl acetate — | PVAc concentration % by mass | NaOH Molar ratio |
| Example 1 | 0.23 | 777 | 170 | 3 | 30 | Fullzone blade | 3.1 | 0.15 | Heat exchanger | 32 | 0.012 |
| Example 2 | 0.23 | 777 | 170 | 3 | 30 | Maxblend blade | 2.2 | 0.13 | Heat exchanger | 32 | 0.01 |
| Example 3 | 0.26 | 873 | 75 | 2 | 26 | Maxblend blade | 3.3 | 0.09 | Heat exchanger | 25 | 0.02 |
| Example 4 | 0.47 | 820 | 128 | 2.5 | 28 | Maxblend blade | 3 | 0.11 | Heat exchanger | 30 | 0.012 |
| Example 5 | 0.61 | 751 | 190 | 9 | 43 | Maxblend blade | 3 | 0.1 | Heat exchanger | 40 | 0.02 |
| Example 6 | 0.69 | 682 | 185 | 82.6 | 70 | Maxblend blade | 1.9 | 0.1 | Heat exchanger | 45 | 0.015 |
| Example 7 | 0.27 | 906 | 42 | 1.8 | 24 | Maxblend blade | 4 | 0.16 | Direct | 25 | 0.022 |
| Example 8 | 0.61 | 751 | 190 | 9 | 43 | Maxblend blade | 3 | 0.1 | Heat exchanger | 40 | 0.02 |
| Example 9 | 0.61 | 751 | 190 | 9 | 43 | Maxblend blade | 3 | 0.1 | Heat exchanger | 40 | 0.02 |
| Example 10 | 0.61 | 751 | 190 | 9 | 43 | Maxblend blade | 3 | 0.1 | Heat exchanger | 40 | 0.02 |
| Comparative Example 1 | 0.61 | 751 | 190 | 9 | 43 | Two-stage inclined paddle blade | 2 | 0.18 | Direct | 40 | 0.02 |
| Comparative Example 2 | 0.61 | 751 | 190 | 9 | 43 | Maxblend blade | 0.8 | 0.02 | Heat exchanger | 40 | 0.02 |
| Comparative Example 3 | 0.1 | 745 | 2 | 202.7 | 78 | Maxblend blade | 6.9 | 0.21 | Heat exchanger | 45 | 0.008 |
| Comparative Example 4 | 0.61 | 751 | 190 | 9 | 43 | Anchor blade | 1.7 | 0.17 | Heat exchanger | 40 | 0.02 |
| Comparative Example 5 | 1.77 | 735 | 174 | 41 | 50 | Anchor blade | 1.8 | 0.17 | Heat exchanger | 40 | 0.03 |
| Comparative Example 6 | 0.69 | 682 | 185 | 82.6 | 70 | Maxblend blade | 1.9 | 0.1 | Heat exchanger | 45 | 0.03 |

TABLE 2

| | Adhesive | | | | |
|---|---|---|---|---|---|
| | Ethylene-vinyl alcohol copolymer | | | | |
| | Ethylene unit (mol %) | Polymerization degree | Saponification degree (mol %) | Block character | Inorganic filler [1)] |
| Example 1 | 2 | 1700 | 98.5 | 0.95 | 1 |
| Example 2 | 2 | 1700 | 93 | 0.95 | 1 |
| Example 3 | 2 | 2300 | 99.3 | 0.96 | 3 |
| Example 4 | 4 | 1700 | 98.5 | 0.97 | 2 |
| Example 5 | 6 | 1000 | 99.2 | 0.98 | 1 |
| Example 6 | 10 | 400 | 98 | 0.98 | 2 |
| Example 7 | 2 | 2800 | 99.5 | 0.93 | 3 |
| Example 8 | 6 | 1000 | 99.2 | 0.98 | 1 |
| Example 9 | 6 | 1000 | 99.2 | 0.98 | 1 |
| Example 10 | 6 | 1000 | 99.2 | 0.98 | 1 |
| Comparative Example 1 | 6 | 1000 | 99.2 | 0.85 | 1 |
| Comparative Example 2 | 6 | 1000 | 99.2 | 0.88 | 1 |
| Comparative Example 3 | 2 | 500 | 88 | 1.01 | 3 |
| Comparative Example 4 | 6 | 1000 | 99.2 | 0.89 | 1 |
| Comparative Example 5 [5)] | 22 | — | — | 0.99 | This became insoluble in water, and thus subsequent physical property evaluation was impracticable. |
| Comparative Example 6 | 10 | 400 | 99.9 | 0.98 | 2 |

TABLE 2-continued

| | Adhesive | | | High-speed coating ability | | High-speed coating ability | | | Water-resistant adhesiveness | |
| --- | --- | --- | --- | --- | --- | --- | --- | --- | --- | --- |
| | Compound having a conjugated double bond | | Solid concentration (%) | Viscosity (mPa · s) | Jumping | Roll transfer | Foaming [4] | Stringing | 50 μm application | 75 μm application |
| | Type [2] | Content [3] (parts by mass) | | | | | | | | |
| Example 1 | DPMP | $40 \times 10^{-4}$ | 23.2 | 1270 | A | A | 0.90 | A | A | A |
| Example 2 | SA | $1.8 \times 10^{-4}$ | 23.1 | 1250 | A | A | 0.87 | A | A | A |
| Example 3 | SA | $1.8 \times 10^{-4}$ | 17.7 | 1310 | A | A | 0.91 | A | A | A |
| Example 4 | SA | $1.8 \times 10^{-4}$ | 23.2 | 1290 | A | A | 0.93 | A | A | A |
| Example 5 | SA | $1.8 \times 10^{-4}$ | 28.3 | 1300 | A | A | 0.89 | A | A | A |
| Example 6 | SA | $0.04 \times 10^{-4}$ | 37.8 | 1310 | A | A | 0.90 | A | A | A |
| Example 7 | SA | $1.8 \times 10^{-4}$ | 15.0 | 1210 | A | B | 0.92 | B | A | A |
| Example 8 | — | — | 27.8 | 1220 | B | B | 0.88 | B | A | A |
| Example 9 | DPMP | $110 \times 10^{-4}$ | 27.8 | 1230 | A | A | 0.91 | A | B | A |
| Example 10 | MS polymer | $80 \times 10^{-4}$ | 28.1 | 1280 | A | A | 0.90 | A | B | A |
| Comparative Example 1 | SA | $1.8 \times 10^{-4}$ | 28.0 | 1240 | C | B | 0.81 | B | A | A |
| Comparative Example 2 | SA | $1.8 \times 10^{-4}$ | 27.7 | 1200 | C | B | 0.84 | B | A | A |
| Comparative Example 3 | SA | $1.8 \times 10^{-4}$ | 35.9 | 1300 | A | A | 0.86 | A | C | B |
| Comparative Example 4 | SA | $1.8 \times 10^{-4}$ | 27.8 | 1210 | C | B | 0.83 | B | A | A |
| Comparative Example 5 [5] | This became insoluble in water, and thus subsequent physical property evaluation was impracticable. | | | | | | | | | |
| Comparative Example 6 | SA | $0.04 \times 10^{-4}$ | 38.0 | 1350 | B | C | 0.90 | B | A | A |

[1] 1: kaolinite clay (average particle size: 0.55 μm), 2: kaolinite clay (average particle size: 0.6 μm), 3: heavy calcium carbonate (average particle size: 1.75 μm)
[2] DPMP: 2,4-diphenyl-4-methyl-1-pentene, SA: sorbic acid, MS polymer: α-methylstyrene polymer (having a conjugated double bond at ther end of the molecular chain, molecular weight 1100)
[3] A content of a compound having a conjugated double bond based on 100 parts by mass of an ethylene-vinyl alcohol copolymer
[4] Mass of an adhesive after roll rotation/mass of an adhesive before roll rotation
[5] An ethylene-vinyl alcohol obtained was insoluble in water.

In Comparative Examples 1 and 4, polymerization reaction was conducted using a two-stage inclined paddle blade (Comparative Example 1) or an anchor blade (Comparative Example 4) instead of a wide paddle blade. The ethylene-vinyl alcohol copolymers obtained had a block character of ethylene units of 0.85 (Comparative Example 1) and 0.89 (Comparative Example 4), and exhibited high level of blocking property of ethylene units. In the adhesives obtained using these ethylene-vinyl alcohol copolymers, much splashing (jumping) of adhesive droplets between rolls and stringings of the adhesive were observed, and bubble intrusion in the adhesive solution was vigorous and high-speed coating ability was insufficient.

When a Froude number Fr was too low (Comparative Example 2, Fr: 0.02), an ethylene-vinyl alcohol copolymer having a block character of ethylene units of 0.88 which exhibited high level of blocking property of ethylene units was provided. In the adhesives obtained using the ethylene-vinyl alcohol copolymer, much splashing (jumping) of adhesive droplets between rolls and stringings of the adhesive were observed, and bubble intrusion in the adhesive solution was vigorous and high-speed coating ability was insufficient. When a Froude number Fr was too high (Comparative Example 3, Fr: 0.21), an ethylene-vinyl alcohol copolymer having a block character of ethylene units of 1.01 which exhibited very high randomness of ethylene units was provided. Then, an adhesive produced using the ethylene-vinyl alcohol copolymer exhibited insufficient water-resistant adhesiveness. An adhesive produced using an ethylene-vinyl alcohol copolymer exhibiting a very high saponification degree (Comparative Example 6, saponification degree: 99.9 mol %) failed to be uniformly transferred to a roll, and many stringings of the adhesive was observed.

DESCRIPTIONS OF SYMBOLS

1: Polymerization tank
2: Heat exchanger
3 to 7: Pipes
8: Stirrer
9: Reaction liquid outlet pipe
10: Vinyl ester inlet pipe
11, 12: Refrigerant pipe
13: Gas discharge pipe
21: Maxblend blade
22: Supermix MR203
23: Supermix MR205
24: Fullzone blade

The invention claimed is:

1. An ethylene-vinyl alcohol copolymer, comprising:
ethylene units in a content range of from 1 to less than 20 mol. %;
wherein the ethylene-vinyl alcohol copolymer has a viscosity-average polymerization degree in a range of from 200 to 5000,
wherein the ethylene-vinyl alcohol copolymer has a saponification degree in a range of from 80 to 99.7 mol %, and
wherein of the ethylene units in the ethylene-vinyl alcohol copolymer have a block character in a range of from 0.90 to 0.99.

2. An ethylene-vinyl alcohol copolymer composition, comprising:
the ethylene-vinyl alcohol copolymer of claim 1; and
a compound having a conjugated double bond with a molecular weight of 1000 or less,
wherein the compound is present in a range of from 0.000001 to 0.01 parts by mass, based on 100 parts by mass of the ethylene-vinyl alcohol copolymer.

3. An aqueous solution, comprising:
the ethylene-vinyl alcohol copolymer of claim 1.

4. An adhesive, comprising:
the aqueous solution of claim 3.

5. The adhesive of claim 4, further comprising:
an inorganic filler.

6. The adhesive of claim 5, wherein the inorganic filler is present in a range of from 20 to 500 parts by mass, based on 100 parts by mass of the ethylene-vinyl alcohol copolymer.

7. A method for producing the ethylene-vinyl alcohol copolymer of claim 1, the method comprising:

(a) contacting a solution comprising a vinyl ester with an ethylene comprising gas while stirring the solution with a wide paddle blade in a polymerization tank such that an agitation power Pv per unit volume is in a range of from 0.5 to 10 kW/m$^3$ and a Froude number Fr is in a range of from 0.05 to 0.2, to produce an ethylene-vinyl ester copolymer.

8. The method of claim 7, further comprising, in production of the ethylene-vinyl ester copolymer;
(b) introducing the ethylene comprising gas present in a gas-phase part in the polymerization tank, into a heat exchanger;
(c) feeding the vinyl ester to the heat exchanger;
(d) contacting the vinyl ester with the ethylene comprising gas in the heat exchanger; and
(e) discharging the vinyl ester in which ethylene is dissolved, from the heat exchanger and introducing the vinyl ester into the polymerization tank,
wherein the polymerization tank is connected to the heat exchanger via a pipe.

9. An adhesive, consisting of:
the aqueous solution of claim 3.

10. An adhesive, consisting of:
the aqueous solution of claim 3;
at least one inorganic filler.

11. The ethylene-vinyl alcohol copolymer of claim 1, wherein the ethylene-vinyl alcohol copolymer has a viscosity-average polymerization degree in a range of from 2300 to 5000.

12. The ethylene-vinyl alcohol copolymer of claim 1, comprising the ethylene units in a content range of from 1 to 15 mol. %.

13. The ethylene-vinyl alcohol copolymer of claim 1, comprising the ethylene units in a content range of from 2 to 15 mol. %.

14. The ethylene-vinyl alcohol copolymer of claim 1, comprising the ethylene units in a content range of from 1 to 10 mol. %.

15. The ethylene-vinyl alcohol copolymer of claim 1, comprising the ethylene units in a content range of from 1 to 8.5 mol. %.

16. The ethylene-vinyl alcohol copolymer of claim 1, wherein the ethylene-vinyl alcohol copolymer has a saponification degree in a range of from 82 to 99.5 mol %.

17. The ethylene-vinyl alcohol copolymer of claim 1, wherein the ethylene-vinyl alcohol copolymer has a saponification degree in a range of from 85 to 98.5 mol %.

18. The ethylene-vinyl alcohol copolymer of claim 1, wherein the ethylene units in the ethylene-vinyl alcohol copolymer have a block character in a range of from 0.93 to 0.99.

19. The ethylene-vinyl alcohol copolymer of claim 1, wherein the ethylene units in the ethylene-vinyl alcohol copolymer have a block character in a range of from 0.95 to 0.99.

20. The ethylene-vinyl alcohol copolymer of claim 1, consisting of, in copolymerized form:
the ethylene;
at least one vinyl ester selected from the group consisting of vinyl formate, vinyl acetate, vinyl propionate, vinyl valerate, vinyl caprate, vinyl laurate, vinyl stearate, vinyl benzoate, vinyl pivalate, vinyl versatate, and a mixture thereof; and
at least one further monomer selected from the group consisting of propylene, n-butene isobutylene, acrylic acid optionally as a salt, acrylate ester, methacrylic acid optionally as a salt, methacrylate ester, acrylamide, N-methylacrylamide, N-ethylacrylamide, N,N-dimethylacrylamide, diacetone acrylamide, acrylamide propanesulfonic acid optionally as a salt, acrylamide propyldimethylamine optionally as a salt, N-methylol acrylamide, methacrylamide, N-methylmethacrylamide, N-ethylmethacrylamide, methacrylamide propanesulfonic acid optionally as a salt, methacrylamide propyldimethylamine optionally as a salt, N-methylol methacrylamide, methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, acrylonitrile, methacrylonitrile, vinyl chloride, vinyl fluoride, vinylidene chloride, vinylidene fluoride, allyl acetate, allyl chloride, maleic acid, itaconic acid, fumaric acid, vinyltrimethoxysilane, isopropenyl acetate, and a mixture thereof.

\* \* \* \* \*